United States Patent
Kushner

(10) Patent No.: US 11,403,678 B1
(45) Date of Patent: Aug. 2, 2022

(54) PROPERTY ASSESSMENT SYSTEM

(71) Applicant: Wells Fargo Bank, N.A., San Francisco, CA (US)

(72) Inventor: Kristine Ing Kushner, Orinda, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 186 days.

(21) Appl. No.: 16/939,632

(22) Filed: Jul. 27, 2020

Related U.S. Application Data

(63) Continuation of application No. 15/723,827, filed on Oct. 3, 2017, now Pat. No. 10,769,684.

(51) Int. Cl.
| | |
|---|---|
| *G01M 3/00* | (2006.01) |
| *G06Q 30/02* | (2012.01) |
| *G06Q 50/16* | (2012.01) |
| *F01D 15/00* | (2006.01) |
| *F03B 17/06* | (2006.01) |
| *G05D 1/04* | (2006.01) |
| *F16L 55/26* | (2006.01) |

(52) U.S. Cl.
CPC ......... *G06Q 30/0278* (2013.01); *F01D 15/00* (2013.01); *F03B 17/061* (2013.01); *G05D 1/04* (2013.01); *G06Q 50/16* (2013.01); *F05B 2240/12* (2013.01); *F16L 55/26* (2013.01)

(58) Field of Classification Search
CPC ............... G01M 3/2823; G01M 3/246; G01N 27/00–92; F16L 55/24–48
See application file for complete search history.

(56) References Cited

U.S. PATENT DOCUMENTS

| | | | |
|---|---|---|---|
| 3,546,642 A | * 12/1970 | Burchard | H01F 7/0294 134/8 |
| 3,561,490 A | 2/1971 | Little | |
| 3,649,983 A | 3/1972 | Ver Nooy | |
| 3,673,629 A | * 7/1972 | Casey | G01M 3/005 137/802 |
| 4,057,081 A | * 11/1977 | Jones | G01M 3/005 138/97 |
| 4,083,533 A | 4/1978 | Schwabe | |
| 4,406,030 A | 9/1983 | Platts | |
| 4,518,955 A | 5/1985 | Meyer | |
| 4,715,747 A | 12/1987 | Behrens | |
| 4,729,106 A | 3/1988 | Rush et al. | |

(Continued)

FOREIGN PATENT DOCUMENTS

| | | |
|---|---|---|
| DE | 10333203 A1 | 2/2005 |
| WO | 2008059226 A2 | 5/2008 |

OTHER PUBLICATIONS

Covar Applied Technologies, "Pipe Scanning Radar," http://www.covar.com/pipe-scanning-radar.php, 2017, 3 pages.

(Continued)

*Primary Examiner* — Tran M. Tran
(74) *Attorney, Agent, or Firm* — Merchant & Gould P.C.

(57) ABSTRACT

A property assessment system is provided to assess a property for various purposes. The system includes a property assessment apparatus configured to be inserted into any space of a property and retrieved therefrom once necessary information is collected from the space. The property assessment apparatus operates to monitor various conditions in the space, which is used to assess the property.

20 Claims, 11 Drawing Sheets

(56) References Cited

U.S. PATENT DOCUMENTS

| | | | |
|---|---|---|---|
| 4,866,978 A | 9/1989 | Biggerstaff | |
| 5,153,963 A | 10/1992 | Saxon et al. | |
| 5,388,528 A * | 2/1995 | Pelrine | F16L 55/32 |
| | | | 301/5.1 |
| 5,398,560 A * | 3/1995 | Zollingger | G21C 17/017 |
| | | | 73/865.8 |
| 5,444,436 A | 8/1995 | Kennison | |
| 5,461,354 A * | 10/1995 | Rosenberg | F16L 55/48 |
| | | | 15/104.061 |
| 5,461,746 A * | 10/1995 | Banik | B08B 9/0557 |
| | | | 15/104.061 |
| 5,467,640 A | 11/1995 | Salinas | |
| 5,473,787 A | 12/1995 | Echols | |
| 5,520,871 A | 5/1996 | Rosenberg et al. | |
| 5,645,248 A * | 7/1997 | Campbell | B64B 1/08 |
| | | | 244/30 |
| 5,721,383 A | 2/1998 | Franklin et al. | |
| 5,782,668 A * | 7/1998 | Chabert | A63H 27/10 |
| | | | 446/485 |
| 5,790,476 A | 8/1998 | Stenstrom et al. | |
| 5,918,268 A | 6/1999 | Lukas et al. | |
| 6,009,756 A * | 1/2000 | Willems | G01N 27/902 |
| | | | 73/628 |
| 6,057,773 A * | 5/2000 | Shukla | G01F 23/0038 |
| | | | 374/E13.006 |
| 6,176,938 B1 * | 1/2001 | Palmer | F16L 55/1283 |
| | | | 134/8 |
| 6,249,927 B1 | 6/2001 | Ando | |
| 6,321,676 B1 | 11/2001 | Kohnen et al. | |
| 6,370,945 B2 | 4/2002 | Roberts | |
| 6,401,525 B1 | 6/2002 | Jamieson | |
| 6,820,653 B1 | 11/2004 | Schempf et al. | |
| 6,917,176 B2 | 7/2005 | Schempf et al. | |
| 6,958,693 B2 * | 10/2005 | Rothgeb | C02F 1/008 |
| | | | 340/539.22 |
| 7,086,113 B2 | 8/2006 | Young | |
| 7,131,791 B2 | 11/2006 | Whittaker et al. | |
| 7,221,323 B2 * | 5/2007 | Schantz | H01Q 9/00 |
| | | | 455/96 |
| 7,240,697 B2 | 7/2007 | Beebe et al. | |
| 7,277,822 B2 | 10/2007 | Blemel | |
| 7,341,224 B1 | 3/2008 | Osann, Jr. | |
| 7,441,507 B2 * | 10/2008 | Teraura | B08B 9/049 |
| | | | 104/282 |
| 7,523,666 B2 | 4/2009 | Thompson et al. | |
| 7,980,136 B2 | 7/2011 | Ben-Mansour | |
| 8,098,063 B2 | 1/2012 | Paulson | |
| 8,201,454 B2 | 6/2012 | Paige | |
| 8,217,783 B2 | 7/2012 | Mekid et al. | |
| 8,499,617 B2 | 8/2013 | El Ferik et al. | |
| 8,573,147 B1 | 11/2013 | Tanner | |
| 8,661,909 B2 | 3/2014 | Chu et al. | |
| 8,665,101 B2 | 3/2014 | Solomon | |
| 8,814,084 B2 | 8/2014 | Shenhar | |
| 8,869,599 B2 | 10/2014 | Ben-Mansour et al. | |
| 8,919,179 B2 | 12/2014 | Wolf et al. | |
| 9,101,967 B2 | 8/2015 | Farkavec et al. | |
| 9,151,837 B2 | 10/2015 | Jaganathan et al. | |
| 9,200,744 B2 | 12/2015 | Yang et al. | |
| 9,217,686 B2 | 12/2015 | Li et al. | |
| 9,261,221 B2 | 2/2016 | Kiest, Jr. | |
| 9,285,290 B2 | 3/2016 | Chatzigeorgiou et al. | |
| 9,347,851 B2 | 5/2016 | Hart, Jr. et al. | |
| 9,427,143 B2 | 8/2016 | Glozman et al. | |
| 9,471,819 B2 | 10/2016 | Tucker et al. | |
| 9,625,419 B2 * | 4/2017 | Laursen | G01N 27/82 |
| 9,721,448 B2 | 8/2017 | Wu et al. | |
| 9,739,411 B1 | 8/2017 | Azimi et al. | |
| 9,797,541 B1 | 10/2017 | Hill | |
| 9,804,102 B2 | 10/2017 | Taferner | |
| 9,828,851 B1 * | 11/2017 | Bonavides | E21B 47/26 |
| 9,841,134 B2 | 12/2017 | Ethirajan et al. | |
| 9,989,436 B1 | 6/2018 | Kofoed et al. | |
| 10,065,738 B2 | 9/2018 | Palmer et al. | |
| 10,272,980 B2 | 4/2019 | Abdellatif et al. | |
| 10,315,762 B2 * | 6/2019 | Diez-Garias | B64C 37/00 |
| 10,324,078 B2 * | 6/2019 | Ghods | G01N 33/383 |
| 10,367,447 B2 | 7/2019 | Michaelis, IV et al. | |
| 10,401,325 B2 * | 9/2019 | Thompson | G01N 27/87 |
| 10,444,191 B2 * | 10/2019 | Banks | F16L 55/40 |
| 10,469,021 B2 | 11/2019 | Panas et al. | |
| 10,494,075 B2 * | 12/2019 | Heppe | B64B 1/00 |
| 10,769,684 B1 * | 9/2020 | Kushner | G05D 1/0607 |
| 11,047,759 B2 * | 6/2021 | Van Pol | G01L 19/149 |
| 11,248,465 B2 * | 2/2022 | Danko | F01D 5/005 |
| 2007/0193357 A1 | 8/2007 | Daaland et al. | |
| 2010/0253475 A1 | 10/2010 | Rosen | |
| 2012/0291569 A1 * | 11/2012 | Hill | F16L 55/40 |
| | | | 15/104.063 |
| 2012/0312221 A1 | 12/2012 | Vosburgh | |
| 2013/0125929 A1 | 5/2013 | Inada et al. | |
| 2015/0345688 A1 | 12/2015 | Kersey et al. | |
| 2016/0028605 A1 | 1/2016 | Gil et al. | |
| 2016/0069821 A1 | 3/2016 | Taferner | |
| 2016/0202217 A1 | 7/2016 | Mayo et al. | |
| 2016/0299030 A1 | 10/2016 | Horbach et al. | |
| 2016/0310998 A1 | 10/2016 | Hailey | |
| 2016/0356665 A1 | 12/2016 | Felemban et al. | |
| 2017/0030528 A1 | 2/2017 | Dietzen et al. | |
| 2017/0038233 A1 | 2/2017 | Joshi et al. | |
| 2017/0097272 A1 | 4/2017 | Zulfiquar | |
| 2017/0299108 A1 | 10/2017 | Perstnev | |
| 2017/0350241 A1 * | 12/2017 | Shi | E21B 47/07 |
| 2018/0149546 A1 | 5/2018 | Boyes | |
| 2019/0376785 A1 * | 12/2019 | Shen | G01N 29/2412 |
| 2021/0132162 A1 * | 5/2021 | Ring | G01R 33/10 |
| 2021/0238991 A1 * | 8/2021 | Shand | G01B 7/281 |
| 2022/0003352 A1 * | 1/2022 | Van Andel | G01V 3/081 |

OTHER PUBLICATIONS

Somani, "Recent Advances in Pipe Wall Assessment Technology," http://www.ndt.net/article/jrc-nde2012/papers/114.pdf, 2012, 9 pages.

Hafezi et al., "Application of Cross-Correlation in Pipe Condition Assessment and Leak Detection; Using Transient Pressure and Acoustic Waves," www.sapub.org/global/showpaperpdf.aspx?doi=10.5923/j.re.20150505.04, 2015, 8 pages.

Butterfield et al. "Experimental investigation into vibro-acoustic emission signal processing techniques to quantify leak flow rate in plastic water distribution pipes," http://www.sciencedirect.com/science/article/pii/S0003682X17300099, 2017, 155 pages.

SewerBatt, "SewerBatt product Overview," http://acousticsensing.co.uk/sewerbatt-product-overview/, 2017, 2 pages.

Nguyen et al., "Low-Cost Sensors for Natural Gas Pipeline Monitoring and Inspection," http://www.energy.ca.gov/2014publications/CEC-500-2014-104/CEC-500-2014-104.pdf, 2015, 56 pages.

* cited by examiner

PROPERTY ASSESSMENT SYSTEM

BACKGROUND

Many spaces in buildings or other real properties need to be inspected and assessed for various reasons. Such spaces include conduits for fluids, such as ducts or pipes for air or liquid. Assessment of a space and contents therein can reveal information that affects the value of the property that contains the space. The information from the space and contents therein is also helpful in determining maintenance requirements and remediation inside the space. However, where a space in a property is not easily accessible, the inspection, maintenance, or remediation of the space typically requires entire or partial destruction of the property.

SUMMARY

In general terms, the present disclosure relates to a property assessment system. In one possible configuration and by non-limiting example, the system includes a property assessment apparatus configured to be inserted into a space of the property and retrieved therefrom once necessary information is collected from the space. Various aspects are described in this disclosure, which include, but are not limited to, the following aspects.

One aspect is an apparatus for assessing a space in a property. The apparatus includes a housing, a processing unit mounted to the housing, a data collection device, and an actuation device. The data collection device is mounted to the housing and controlled by the processing unit. The data collection device is configured to collect data within the space in the property. The data is usable to assess conditions of the property. The actuation device is mounted to the housing and controlled by the processing unit. The actuation device is configured to actuate the apparatus to move within the space in the property. The actuation device includes a buoyancy adjust device configured to adjust a buoyancy of the housing.

Another aspect is a method of assessing a space in a property. The method includes adjusting a buoyance of a property assessment apparatus; inserting the apparatus into the space; enabling the apparatus to collect data from the space; obtaining the data obtained in the space; and evaluating the data to assess the property.

Yet another aspect is a system for assessing a conduit in a property. The system includes a property assessment apparatus, an interrogation device, and a property data management system. The property assessment apparatus includes a housing, a processing unit mounted to the housing, a data collection device, and an actuation device. The data collection device is mounted to the housing and controlled by the processing unit. The data collection device is configured to collect data within the conduit in the property. The data is usable to assess conditions of the property. The actuation device is mounted to the housing and controlled by the processing unit. The actuation device is configured to actuate the apparatus to move within the conduit in the property. The actuation device includes a buoyancy adjust device configured to adjust a buoyancy of the housing. The interrogation device is configured to externally power the apparatus and communicate with the apparatus to receive the data from the apparatus. The property data management system is configured to receive the data from the interrogation device and assess the property based on the data.

DETAILED DESCRIPTION

Figure 1:
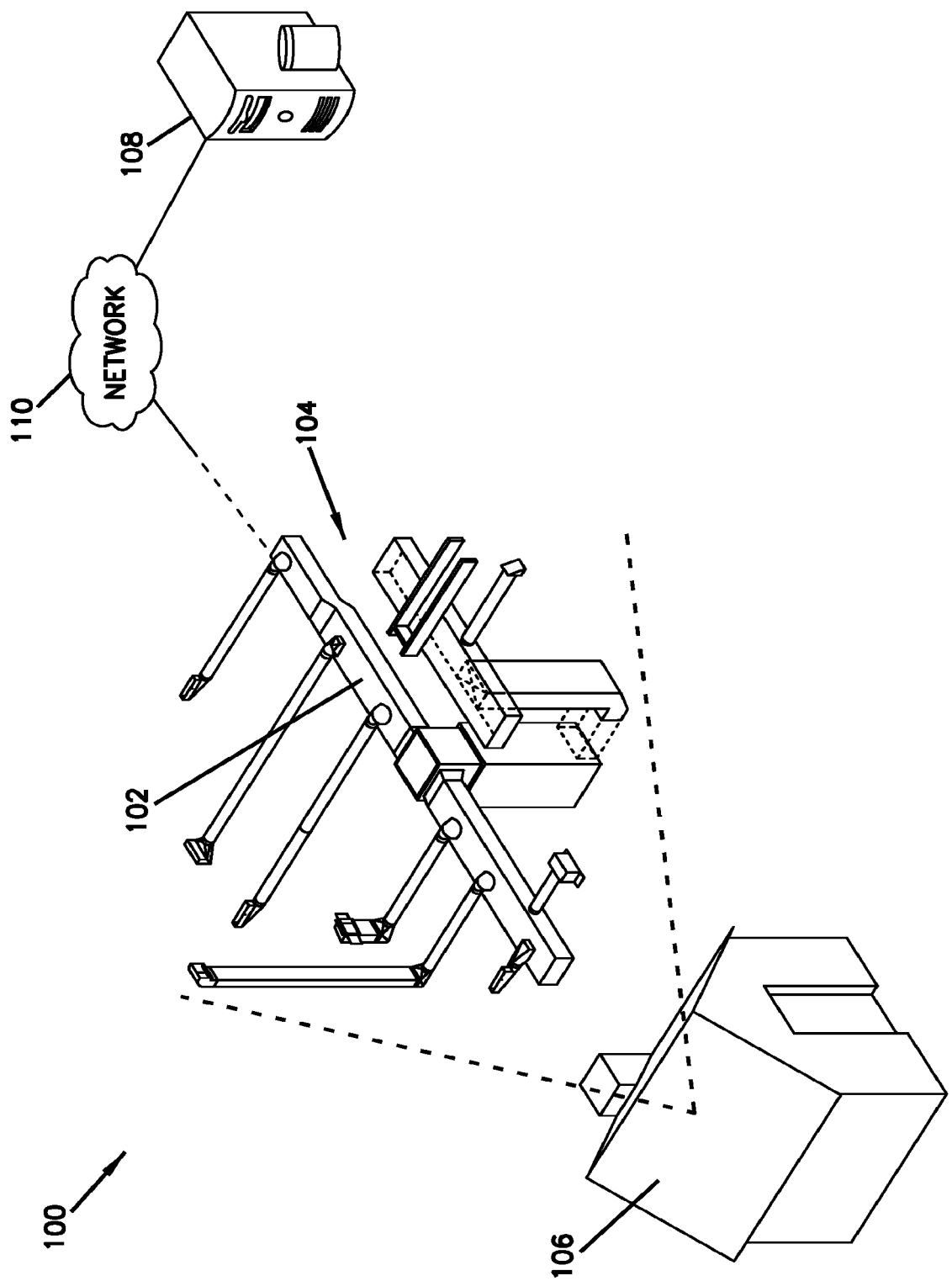
FIG. 1 illustrates an example a system for assessing a property.

Various embodiments will be described in detail with reference to the drawings, wherein like reference numerals represent like parts and assemblies throughout the several views.

FIG. 1 illustrates an example a system 100 for assessing a property. In this example, the system 100 includes a property assessment apparatus 102 to inspect a space 104 in a property 106.

In some embodiments, the property 106 includes a building, such as a house, school, store, factory, and other structures that is used as a place for people to live, work, do activities, store things, etc.

The space 104 in the property 106 can be of various types. In some examples, the space 104 includes one or more conduits, such as a water pipe, sewer pipe, gas pipe, other fluid pipe, and duct. In other examples, the space 104 can be any space that is not conveniently accessible by a person, such as a gap between structures, an attic, a ceiling, a space behind a wall (e.g., drywall), and a space under flooring. The space 104 in the property 106 needs to be inspected and assessed for various purposes, such as appraisal, insurance, and maintenance, as described herein.

The property assessment apparatus 102 operates to monitor various conditions in the space 104, which is used to assess the space 104 in the property 106. As described herein, the property assessment apparatus 102 can be introduced into the space 104 with no or little damage to the property 106, and collect data in the space 104 while moving within the space 104. An example of the property assessment apparatus 102 is further described with reference to FIG. 2.

In some embodiments, the property assessment apparatus 102 is operable to communicate with a property data management system 108 via a data communication network 110.

The property data management system 108 operates to manage data collected using the property assessment apparatus 102. Further, the property data management system 108 is configured to assess the property for various purposes, such as appraisal, insurance, maintenance, and remediation. In some embodiments, the property data management system 108 includes one or more computing devices, which are illustrated as an example with reference to FIG. 11.

The data communication network 110 communicates digital data between one or more computing devices, such as among the property assessment apparatus 102 and the property data management system 108. Examples of the network 110 include a local area network and a wide area network, such as the Internet. In some embodiments, the network 110 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as utilizing wireless routers or wireless access points), cellular communication devices (such as utilizing one or more cellular base stations), and other wireless communication devices.

Figure 2:
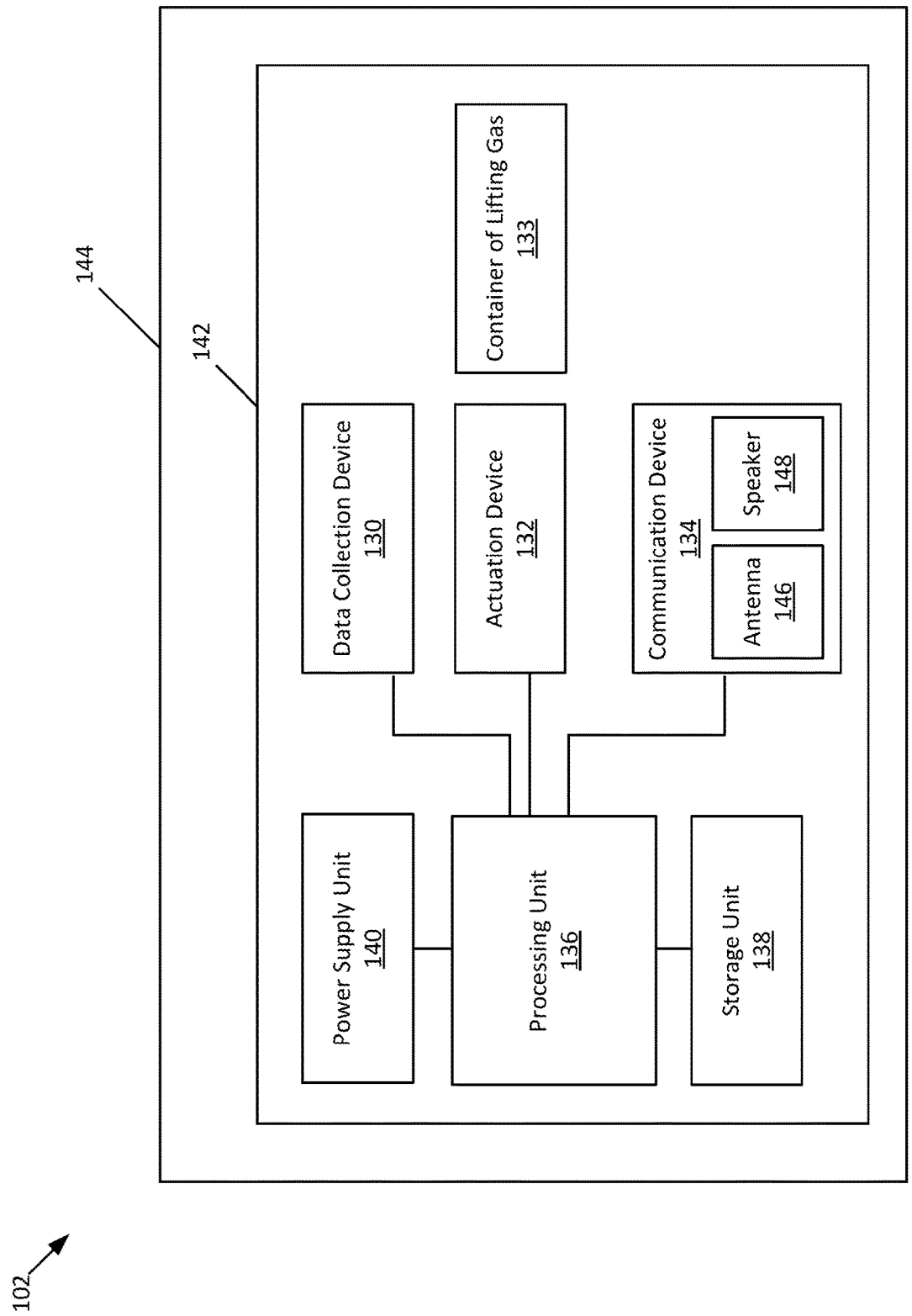
FIG. 2 is a block diagram that illustrates an example of the property assessment apparatus.

FIG. 2 is a block diagram that illustrates an example of the property assessment apparatus 102. In this example, the property assessment apparatus 102 includes a data collection device 130, an actuation device 132, a communication device 134, a processing unit 136, a storage unit 138, and a power supply unit 140. The devices and units can be at least partially received and mounted to a housing 142. In some embodiments, the property assessment apparatus 102 further includes a protective cage 144.

In general, the property assessment apparatus 102 is introduced to a subject space 104 and retrieved downstream. As the property assessment apparatus 102 traverses the subject space 104, the property assessment apparatus 102 collects various types of data in various manners. In some embodiments, the collected data are obtained at the point that the apparatus 102 is retrieved, or after the retrieval of the apparatus 102. Alternatively, the apparatus 102 can transmit data in real time as it traverses the subject space 104. In other embodiments, the apparatus 102 is configured to move to a predetermined location in the subject space 104, at which point the collected data can be obtained from the apparatus 102 by a device (e.g., an interrogation device 300 as described herein) external to the subject space 104. In yet other embodiments, the apparatus 102 can be configured to locally store the data collected from the subject space 104 and needs not be transmitted to another computing device.

The property assessment apparatus 102 is configured to be consumable. In some examples, the apparatus 102 is configured to be retrieved from the subject space 104 after inspection of the subject space 104. The apparatus 102 can be reused with or without retreatment, repair, or restoration. In other examples, the apparatus 102 is configured to be disposable. Once the apparatus 102 operates to collect data within the subject space 104 and transmit the data to another computing device, such as the property data management system 108 or the interrogation device 300 (FIGS. 8 and 10), the apparatus 102 can remain within the subject space 104, which can be discarded from, or together with, the subject space 104 afterwards (e.g., when the subject space 104 is cleaned up or replaced), or reactivated for other inspections in the future.

In some examples, a plurality of property assessment apparatuses 102 can be used as a group. The property assessment apparatuses 102 in a group can be configured for different versions or functionalities.

For example, one or more of the group of property assessment apparatuses 102 (which can be referred to herein as a pilot version of property assessment apparatus) can be configured to assess or prepare the space before other property assessment apparatus 102 having different functionalities, such as a data collection version of property assessment apparatus 102, is introduced into the space. The pilot version of apparatuses can be configured as a set of objects in different sizes, at least some of which can self-destruct without damaging the space. The speed of the objects of different sizes can determine the size of the apparatus that will be able to traverse the space. By way of example, if the apparatus can get stuck in the space and/or needs to e dissolve before reaching the end of the space, the apparatus can be configured to move slowly. In some example, the pilot version of apparatus can include a guide line (e.g., a thin cord, wire, or similar type of line) that is tied to an end of the apparatus, so that the apparatus can be pulled through. In other example, the pilot version of apparatus can affix itself to the interior of the space and provide a mount point for the apparatus.

Other versions of apparatuses 102 are also possible. In one example, a power supply version of the apparatus can be provided, which is configured to deliver a battery to another apparatus that is mounted in the space or is moving in the space. In another example, a sample collection version of the apparatus can be provided, which is configured to collect samples from another apparatus that is mounted in the space or is moving in the space, and deliver them out from the space.

Referring still to FIG. 2, the data collection device 130 operates to collect data from the subject space 104 of the property 106 being inspected. The data collected by the apparatus 102 can be of various types. Examples of such collected data include measurements (e.g., temperature, carbon monoxide content, etc.), signals, digital images (including videos), and samples (e.g., physical, chemical, and biological samples) of the contents of the subject space. Examples of the data collection device 130 are further described with reference to FIG. 3.

The actuation device 132 operates to actuate the apparatus 102 so that the apparatus 102 travels within the subject space 104. The actuation device 132 can configured to be of various types. Examples of the actuation device 132 are further described with reference to FIG. 4.

The communication device 134 operates to enable the apparatus 102 to communicate with other computing devices, such as the property data management system 108, the interrogation device 300, and any other devices to transfer data therebetween.

Figure 8:
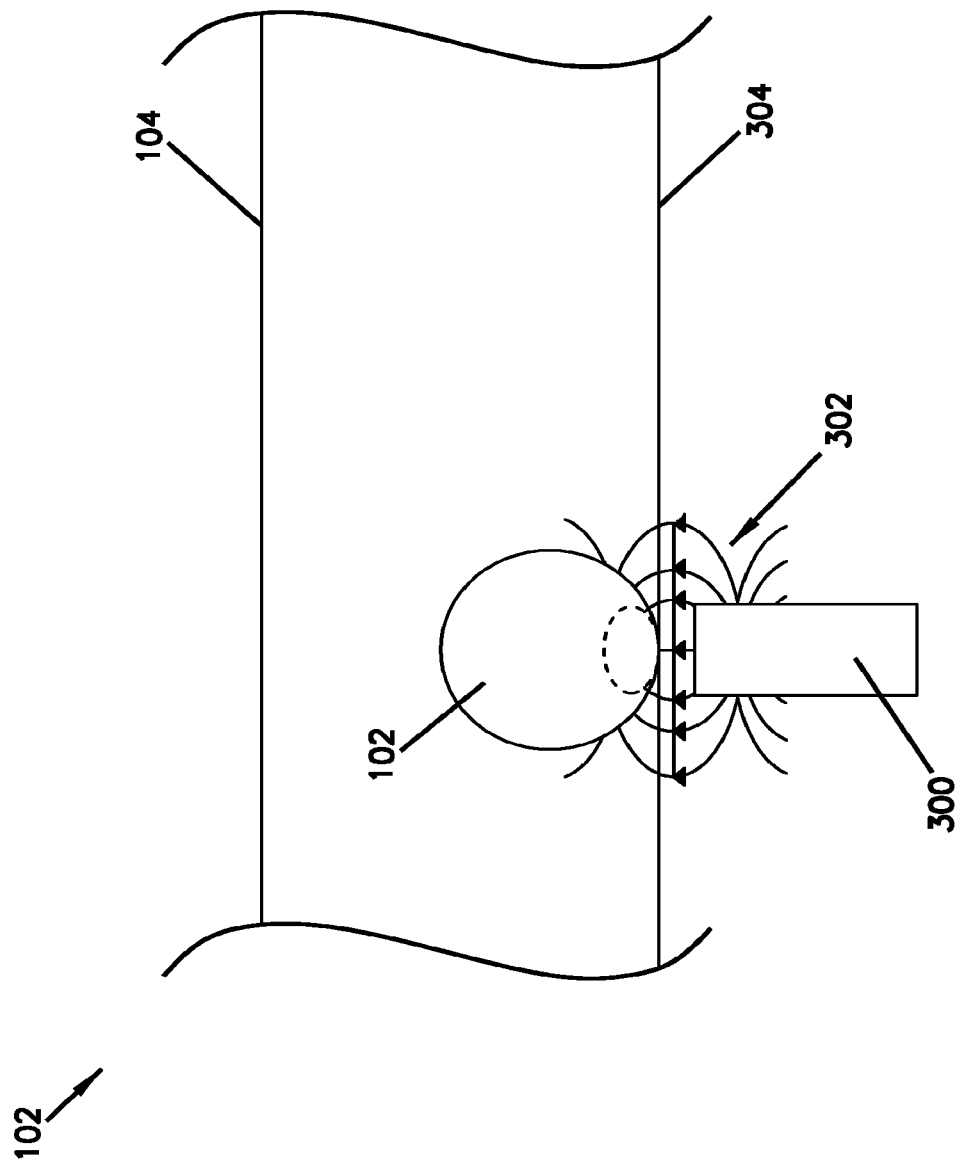
FIG. 8 schematically illustrates an example transmission of data between the property assessment apparatus and an interrogation device.

In some embodiments, the communication device 134 includes an antenna 146 configured to transmit at a predetermined frequency. The antenna 146 can be used to wirelessly (e.g., inductively) power the units and devices in the apparatus 102. As illustrated in FIG. 8, the apparatus 102 is arranged close to, or abutted to, an inner surface of a wall 304 of the subject space 104, and an interrogation device 300, which is located exterior of the subject space 104, can be used to wirelessly transfer power to the apparatus 102 through the wall 304 of the subject space 104. Such wireless power transfer can use time-varying electric, magnetic, or electromagnetic fields 302. For example, power can be transferred by magnetic fields using inductive coupling between the apparatus 102 and the interrogation device 300. In other examples, power can be transferred by electric fields using capacitive coupling between the apparatus 102 and the interrogation device 300. In yet other examples, far-field techniques can be used, such as using electromagnetic radiation between the apparatus 102 and the interrogation device 300.

In some embodiments, the communication device 134 includes a speaker 148. The speaker 148 operates to generate audio signals that are used to locate the apparatus 102 within the subject space 104. The identification of apparatus location can help retrieving the apparatus 102 from the subject space 104 or verifying the movement of the apparatus 102 within the subject space 104. In addition, the speaker 148 can generate different audio signals (which are adjusted in various manners (e.g., sound types and/or volumes)) so that such different audio signals are used to deliver different pieces of information, such as different conditions detected within the subject space 104.

The audio signals generated by the speaker 148 are configured to transmit through the walls (e.g., metal walls) of the subject space 104. In some embodiments, the audio signals are encoded to sonically transmit large amount of information, which can be detected by an external computing device, such as the interrogation device 300 or the property data management system 108. For example, frequency, timing, and/or amplitude changes can be used to encode the information, like FM or AM radio transmission or ultrasonic data transmission. In some applications, the apparatus 102 can generate s sound signal within the subject space, which is transmitted through the wall of the subject space. A user can either directly hear the sound signal or use an external device to detect the sound signal. The external device can be used to deliver a quality version of the sound signal to the user. In addition, the user can use the external device to control the property assessment apparatus 102 within the subject space 104, such as to control the apparatus 102 to find a particular condition within the subject space 104 and transmit the finding back to the external device.

The processing unit 136 operates to control other devices and components of the apparatus 102, such as the data collection device 130, the actuation device 132, and the communication device 134. In some embodiments, the processing unit 136 includes an integrated circuit (IC) configured to assess and/or store data (e.g., the data collected from the subject space 104). The processing unit 136 can be configured for simple evaluation for initial assessment purposes, such as a determination of existence of a particular condition (e.g., "is a particular condition present in the subject space being monitored?"). The processing unit 136 can be configured for further, sophisticating assessment of the subject space. In some embodiments, the processing unit 135 is configured to evaluate the collected data, such as processing and analyzing of the data and assessing the property 106 in various manners. The processing unit 136 can be implemented in a way known in the art, including, for example, a processor, a decoder, and an encoder.

The storage unit 138 includes one or more memories configured to store data, such as the data collected from the subject space and other data usable to evaluate the collected data. The storage unit 138 can be of various types, including volatile and nonvolatile, removable and non-removable, and/or persistent media. In some embodiments, the storage unit 138 is an erasable programmable read only memory (EPROM).

In some embodiments, the power supply unit 140 can be included in the property assessment apparatus 102 and provides power to operate the apparatus 102. In some examples, the power supply unit 140 includes one or more batteries, which is either for single use or rechargeable. In other examples, the power supply unit 140 includes an external power source, such as mains power or external batteries. In yet other examples, the power supply unit 140 includes wireless power transfer using an external device, such as the interrogation device 300, as described above.

In some embodiments, the property assessment apparatus 102 is configured to be buoyant. The housing 142, which at least partially receives and mounts the devices, units, elements, and components of the apparatus 102, can be configured to enable the apparatus 102 to float within a subject space 104. For example, the housing 142 can be configured to be neutrally buoyant.

The housing 142 can be configured to be impermeable to fluid in a subject space 104 and/or corrosion-resistant with the fluid in the subject space 104. The housing 142 can be made of various materials, such as foam, gel, plastic, rubber, metal, and any other suitable materials for buoyancy. In some examples, the housing 142 includes a container (e.g., chamber or bag) that can contain a lifting gas to create buoyancy. The container of lifting gas 133 is mounted to the housing 142 of the apparatus 102 (e.g., to a mounting device 206 in FIG. 5), or received within the housing 142 of the apparatus 102. Alternatively, the container of lifting gas can be a separate unit from the apparatus 102. Examples of the lifting gas include helium, hydrogen, heated air, steam, ammonia, methane, neon, nitrogen, vacuum, plasma, and any combination thereof. By way of example, the housing 142 includes a space for receiving a balloon that can be inflated with a lifting gas.

The housing 142 can be configured in various shapes. In some embodiments, the housing 142 is shaped to avoid being caught or stuck by structures in the subject space 104. In addition, the housing 142 is configured to allow the data collection device 130 to effectively collect data within the subject space 104. By way of example, the housing 142 is shaped to mount an image capture device (e.g., a digital camera) so that the image capture device is pointed at a target area within the subject space 104.

In some embodiments, the protective cage 144 is provided to the apparatus 102 to protect the apparatus 102 in operation. For example, the protective cage 144 is configured to surround the housing 142 so as to protect the housing 142 from damage. The protective cage 144 is configured to allow fluid to pass through without undue turbulence or obstruction while preventing various components (e.g., propellers or other structures exposed at the housing 142) from damage due to collision. The protective cage 144 can be made of various materials, such as plastic or metal.

Figure 3:
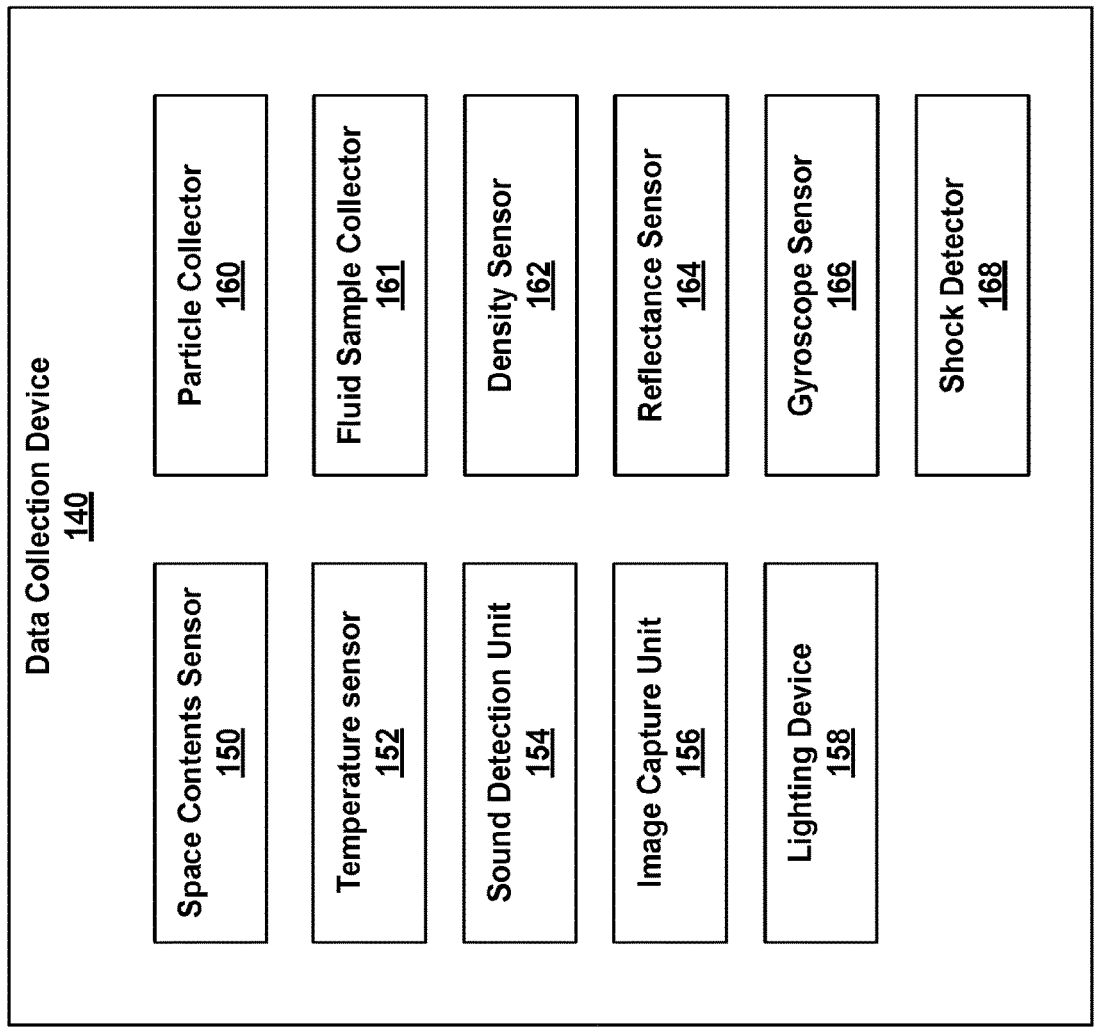
FIG. 3 is a block diagram that illustrates an example data collection device.

FIG. 3 is a block diagram that illustrates an example of the data collection device 130. In this example, the data collection device 130 includes a subject space content detector 150, a temperature sensor 152, a sound detector 154, an image capture device 156, a lighting device 158, a particle collector 160, a fluid sample collector 161, a density sensor 162, a reflectance sensor 164, a gyroscope sensor 166, and a shock detector 168. In other examples, the data collection device 130 includes other devices and/or sensors for measuring and collecting data and samples in the subject space 104 being inspected.

In some embodiments, each of the devices, sensors, and collectors in the data collection device 130 can operate to continuously collect data as the property assessment apparatus 102 moves within the subject space 104. In other embodiments, each of the devices, sensors, and collectors in the data collection device 130 can operate to collect data periodically. In yet other embodiments, each of the devices, sensors, and collectors in the data collection device 130 can operate to collect data in predetermined times and/or locations within the subject space 104, or as requested by an external device, such as the property data management system 108 or the interrogation device 300.

The subject space content detector 150 operates to detect one or more contents within the subject space 104. Examples of such contents include water, lead, mold, mildew, biomaterial, carbon, and any other materials that are undesirable in the subject space 104. In some embodiments, the subject space content detector 150 includes one or more chemical sensors which transform chemical information (e.g., composition, presence of a particular element or ion, concentration, chemical activity, partial pressure, etc.) into signals.

The temperature sensor 152 is used to measure a temperature in the subject space 104. In some embodiments, a maximum temperature and/or a minimum temperature can be stored in the apparatus 102 and used for later analysis.

The sound detector 154 operates to detect and record sounds within the subject space 104. One example of the sound detector 154 is a microphone.

The image capture device 156 operates to take images within the subject space 104. Such images include still photographs and videos. One example of the image capture device 156 is a digital camera. As described herein, the data obtained and assessed from the subject space 104 can include images of the inside of the subject space, which can be transmitted to another computing device for assessment. In some embodiments, the image capture device 156 operates to take such images once the other devices in the data collection device 130 detect potential issues in the subject space 104 and send a request to the image capture device 156 for capturing images of such potential issues.

The lighting device 158 operates to illuminate near or around the apparatus 102. The lighting device 158 can be operated in sync with other devices or elements in the apparatus 102, such as the image capture device 156.

The particle collector 160 operates to collect a sample of particles, objects, or other contents in the subject space 104. Such particles can include mold, mildew, asbestos, dust, animal fur (e.g., mouse fur), and any other materials or particles undesirable in the subject space 104. The particle collector 160 can include one or more various structures configured to gather such particles. In some embodiments, the particle collector 160 includes an adhesive material or substance, such as an adhesive tape (e.g., sticky tape) for collecting sample particles. In other embodiments, the particle collector 160 is configured to mount one or more sampling cassettes (e.g., lead sampling cassettes, air monitoring cassettes, mold sampling cassettes, etc.) which are commercially available. In yet other embodiments, the particle collector 160 includes one or more scrapers, scoops, abrasive materials, and/or other structures configured to pick up samples or objects in the subject space 104, such as from an interior wall of the subject space 104. Such scrapers or scoops can have a flat or clawed tip.

The fluid sample collector 161 operates to collect a sample of the fluid (e.g., gas and/or liquid) through which the apparatus 102 traverses. Some examples of the fluid sample collector 161 include a chamber that can remain open until the fluid sample is collected from the space as the apparatus 102 moves or is either temporarily or permanently stationary in the space. The chamber can be operated to selectively open. For example, the fluid sample collector 161 includes an actuator that is used to release a spring loaded gate that can seal the chamber when the gate is closed. In other examples, the fluid sample collector 161 includes an absorbent material which can absorb the fluid sample from the space. The fluid sample collected from the space can be used for various evaluation purposes, such as evaluation of presence of metals (e.g., lead, mercury, etc.), chemicals, or gaseous contaminants (e.g., radon, carbon monoxide, gas leak, etc.).

The density sensor 162 operates to measure the density within the subject space 104. For example, the density sensor 162 can measure substances (e.g., slurries, sludges, and other liquids) which flow within the subject space.

The reflectance sensor 164 operates to measure reflectance of materials within the subject space 104.

The gyroscope sensor 166 operates to detect angular velocity (e.g., rotational motion or change in orientation), which can be used to control the movement and orientation of the apparatus 102. In some embodiments, the gyroscope sensor 166 is configured to be heavier than a weighted bottom of the property assessment apparatus 102.

The shock detector 168 operates to detect a physical shock or impact within the subject space 104. In some embodiments, this can be used to detect potentially damages to the apparatus 102 and/or any structure within the subject space 104.

Figure 4:
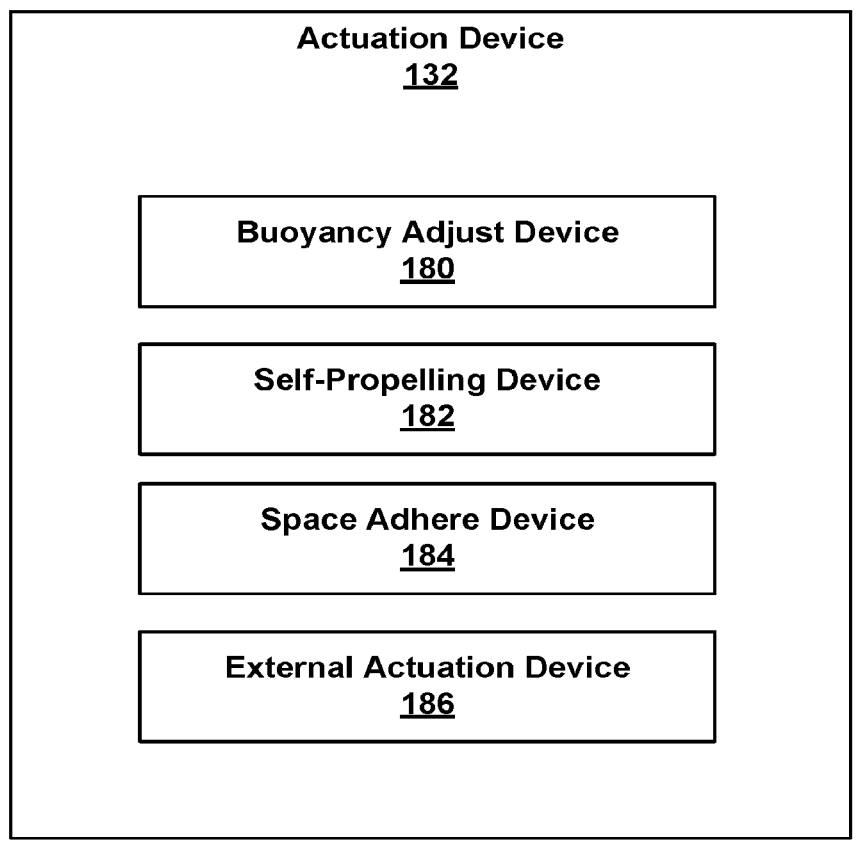
FIG. 4 is a block diagram that illustrates an example actuation device.

FIG. 4 is a block diagram that illustrates an example of the actuation device 132. In this example, the actuation device 132 includes a buoyancy adjust device 180, a self-propelling device 182, a space adhere device 184, and an external actuation device 186.

As described herein, the property assessment apparatus 102 is configured to be buoyant. In some embodiments, the buoyancy adjust device 180 is used to maintain the apparatus 102 to be neutrally buoyant within the subject space 104. The buoyancy adjust device 180 is configured to adjust the buoyancy of the apparatus 102 (e.g., the housing 142 thereof). In some embodiments, the buoyancy adjust device 180 includes a valve (e.g., a valve 204 in FIG. 5) that controls the flow of a lifting gas into or from the container of the lifting gas in the housing 142 of the apparatus 102. For example, the valve can be used to control the volume of the lifting gas within the housing 142, thereby adjusting the buoyancy of the apparatus 102. In some embodiments, the valve can be configured to connect with an external container that contains a lifting gas and supplies it to the apparatus 102.

Alternatively or in addition, the buoyancy adjust device 180 includes one or more weights that are mountable to the housing 142 of the apparatus 102. The number and/or size of the weights mounted to the housing 142 can adjust the buoyancy of the apparatus 102. Further, the location of the weights with respect to the housing 142 can adjust the orientation of the apparatus 102 as the apparatus 102 moves within the subject space 104. By way of example, the weights can be mounted to the bottom of the housing 142 in order to maintain the apparatus 102 upright as it moves. The weights can be mounted to the housing 142 in various manners, such as using adhesives, fasteners, snap-in, or interference-fit.

The self-propelling device 182 operates to enable the property assessment apparatus 102 to be self-propelled. In some examples, the self-propelling device 182 includes one or more propellers 202 (FIG. 7) that can be selectively operated to maneuver the apparatus 102 through a fluid (e.g., gas or liquid) in the subject space 104. The self-propelling device 182 can include one or more motors that operate the propellers. An example of the propellers 202 as the self-propelling device 182 is further illustrated and described with reference to FIG. 7.

In other examples, the self-propelling device 182 includes a container of propellant. The propellant contained in the apparatus 102 can be a chemical substance used to produce energy or pressurized gas that is subsequently used to move the apparatus 102. Examples of such propellant include energetic materials, such as a fuel (e.g., gasoline, jet fuel, rocket fuel, and oxidizer). The container of propellant can mount to the housing 142 of the apparatus 102 (e.g., to a mounting device 206 in FIG. 5), or received within the housing 142 of the apparatus 102. Alternatively, the container of propellant can be a separate unit from the apparatus 102.

In yet other examples, the self-propelling device 182 includes a mechanical device, such as a turbine, which extracts energy from a fluid flow (such as in the subject space 104) and converts it into useful work that operates the apparatus 102.

The space adhere device 184 operates to adhere the apparatus 102 to an interior wall of the subject space 104. The apparatus 102 can remain stationary or movable to a limited extent against the interior wall of the subject space 104 by the space adhere device 184. In some examples, the space adhere device 184 includes a suction device that enables the apparatus 102 to adhere to the inner wall of the subject space 104. In other examples, the space adhere device 184 includes a magnet that allows the apparatus 102 to stick to a metallic inner wall of the subject space 104. The space adhere device can alternatively include a device (e.g., solenoid) creating a magnetic field for the same function as the magnet.

The external actuation device 186 operates to make the apparatus 102 move within the subject space 104 by an external device, such as the interrogation device 300 as shown in FIG. 8. For example, the external actuation device 186 operates in conjunction with a device (e.g., the interrogation device 300) external to the subject space 104 that can produce a magnetic field. As described herein, such a magnetic field can power the apparatus 102 so that the apparatus 102 operates within the subject space 104. In other examples, the external actuation device 186 includes a ferromagnetic material so that the apparatus 102 is actuated by the external device.

Figure 5:
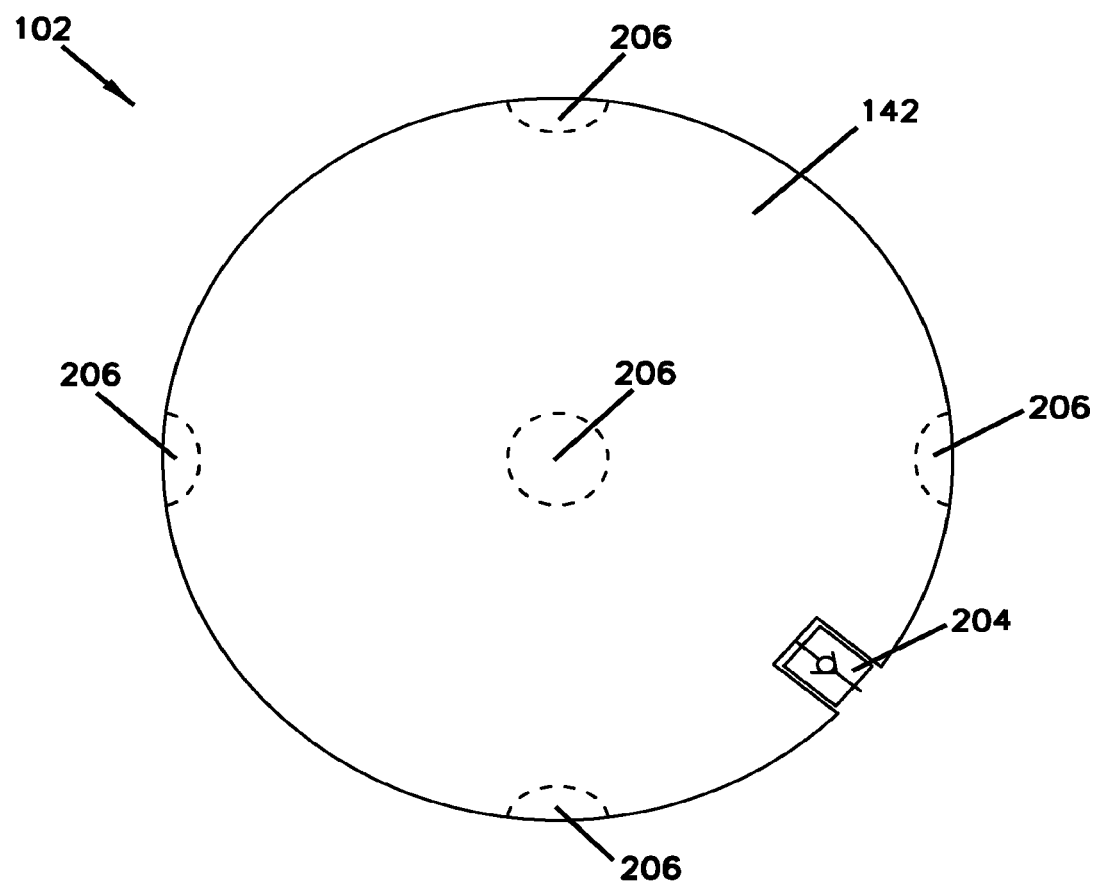
FIG. 5 is a schematic view of an example structure of the property assessment apparatus.

FIG. 5 is a schematic view of an example structure of the property assessment apparatus 102. In this example, the apparatus 102 is configured to be spherical in shape. In some embodiments, the housing 142 of the apparatus 102 is configured as a balloon that contains a lifting gas (e.g., helium) to make the apparatus 102 neutrally buoyant where the apparatus 102 is to traverse a subject space 104 filled with fluid. In some embodiments, a lookup table or chart is provided to show inflation sizes of the balloon for different concentrations of lifting gas. An external supply of lifting gas can be provided to contain a lifting gas and deliver it into the balloon. In some examples, the housing 142 includes a valve 204 through which the lifting gas is delivered from the external lifting gas supply into the housing 142. One example of the valve 204 includes a one-way valve.

In some embodiments, the housing 142 of the apparatus 102 includes one or more mounting devices 206 configured to mount various elements (e.g., units, devices, and components) of the apparatus 102, such as those shown in FIGS. 2-4. The mounting devices 206 can be configured as recesses or pockets into which the elements of the apparatus 102 are at least partially received and mounted. For example, the mounting devices 206 are used to mount the data collection device 130 (e.g., sensors and sample collectors), the actuation device 132 (e.g., a container of lifting gas and propellers), the communication device 134 (e.g., an antenna), the processing unit 136, the storage unit 138, and/or the power supply unit 140. In some embodiments, the mounting devices 206 are symmetrically arranged on the housing 142 for balancing.

Figure 6:
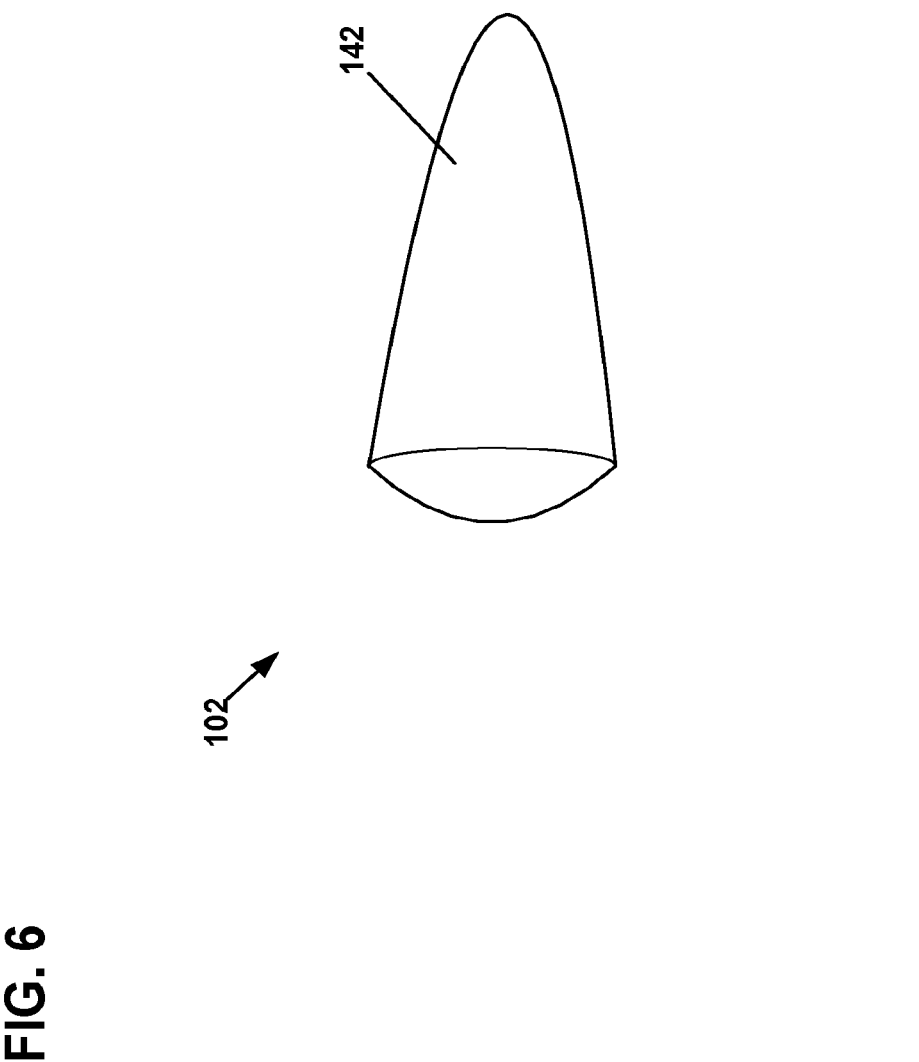
FIG. 6 is a schematic view of another example structure of the property assessment apparatus.

FIG. 6 is a schematic view of another example structure of the property assessment apparatus 102. In this example, the apparatus 102 is shaped to be resistant to getting stuck in the subject space 104. As illustrated, the housing 142 of the apparatus 102 is cone-shaped, or streamlined (e.g., tapered from one end to the other end), so as to present little resistance to fluid in the subject space 104.

Figure 7:
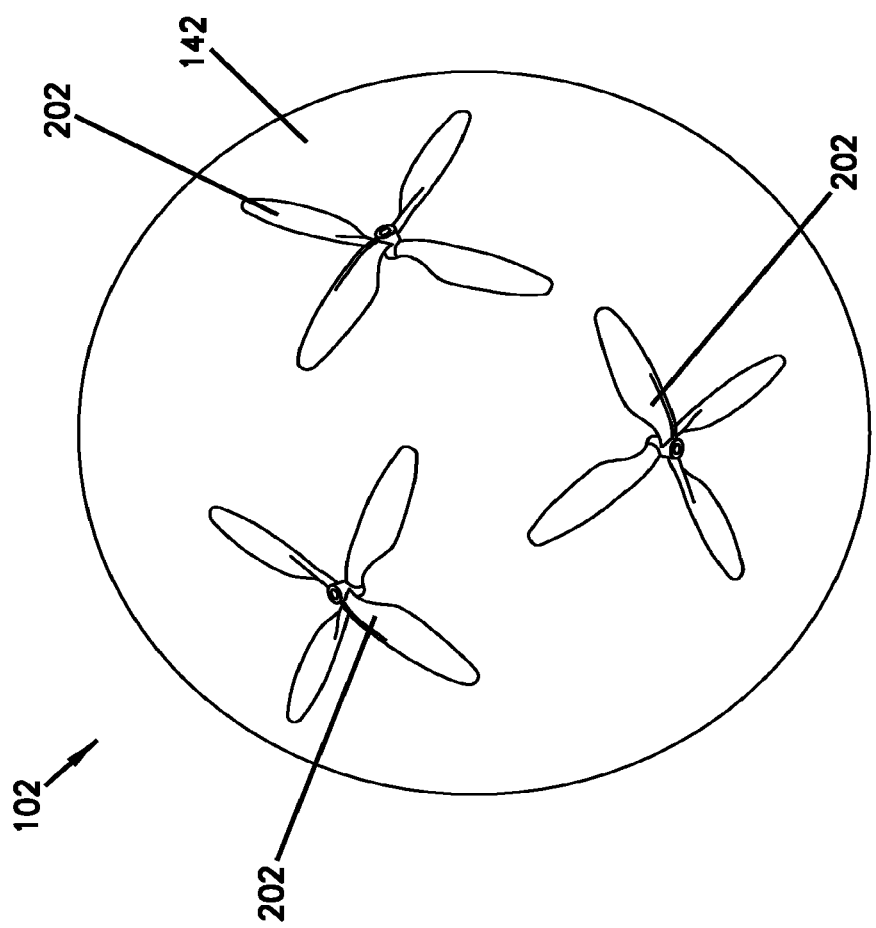
FIG. 7 is a schematic view of yet another example structure of the property assessment apparatus.

FIG. 7 is a schematic view of yet another example structure of the property assessment apparatus 102. In this example, the apparatus 102 mounts one or more propellers 202 to operate the apparatus 102 to fly. The propellers 202 can be arranged not to interfere with each other and other elements of the apparatus 102, such as the devices and units shown in FIG. 2. The propellers 202 are spaced apart from each other to provide stability to the apparatus 102 in operation. In some embodiments, at least one of the propellers is arranged to face upwards (e.g., located on the top of the apparatus 102) so that the apparatus 102 is driven as a drone. In other embodiments, at least one of the propellers 202 is arranged to enable the apparatus 102 to float like a blimp. In yet other embodiments, the propellers 202 are arranged to enable the apparatus 102 multidirectional movements.

The propellers 202 can be of various configurations. The propellers 202 are configured to be unidirectional or bidirectional. In some embodiments, six propellers 202 are symmetrically positioned around the housing 412 of the apparatus 102. Other numbers of propellers 202 can be symmetrically provided on the housing 412. In some embodiments, the propellers 202 are mounted to the housing 412 to be breakable (i.e., breakway mount).

FIG. 8 schematically illustrates that the property assessment apparatus 102 communicates with an interrogation device 300 external to a subject space 104. In some embodiments where a wall 304 of the subject space 104 is made of metallic material, the apparatus 102 includes a magnetic element, such as a magnet, solenoid (which can be powered by a batter in the apparatus), or ferromagnetic material, which enables the apparatus 102 to adhere to the wall 304 of the subject space 104. When the adhesion occurs, the metallic wall 304 can enable transmission of data between the apparatus 102 and the interrogation device 300 through the wall 304. Alternatively, the apparatus 102 includes a suction device having conductive bits. The suction device can enable the apparatus 102 to adhere to the inner wall of the subject space 104 while the conductive bits are used for data transmission between the apparatus 102 and the interrogation device 300 through the wall 304.

In other embodiments, the interrogation device 300 are provided external to the subject space 104 to attract the apparatus 102 inside the subject space 104 by sending homing signals to the apparatus 102 so that the apparatus 102 adheres to the wall 304 of the subject space 104. The adhesion can happen due to a magnetic or electromagnetic field generated between the apparatus 102 and the interrogation device 300 that includes a corresponding magnetic element, such as a magnet, solenoid, or ferromagnetic material.

Figure 9:
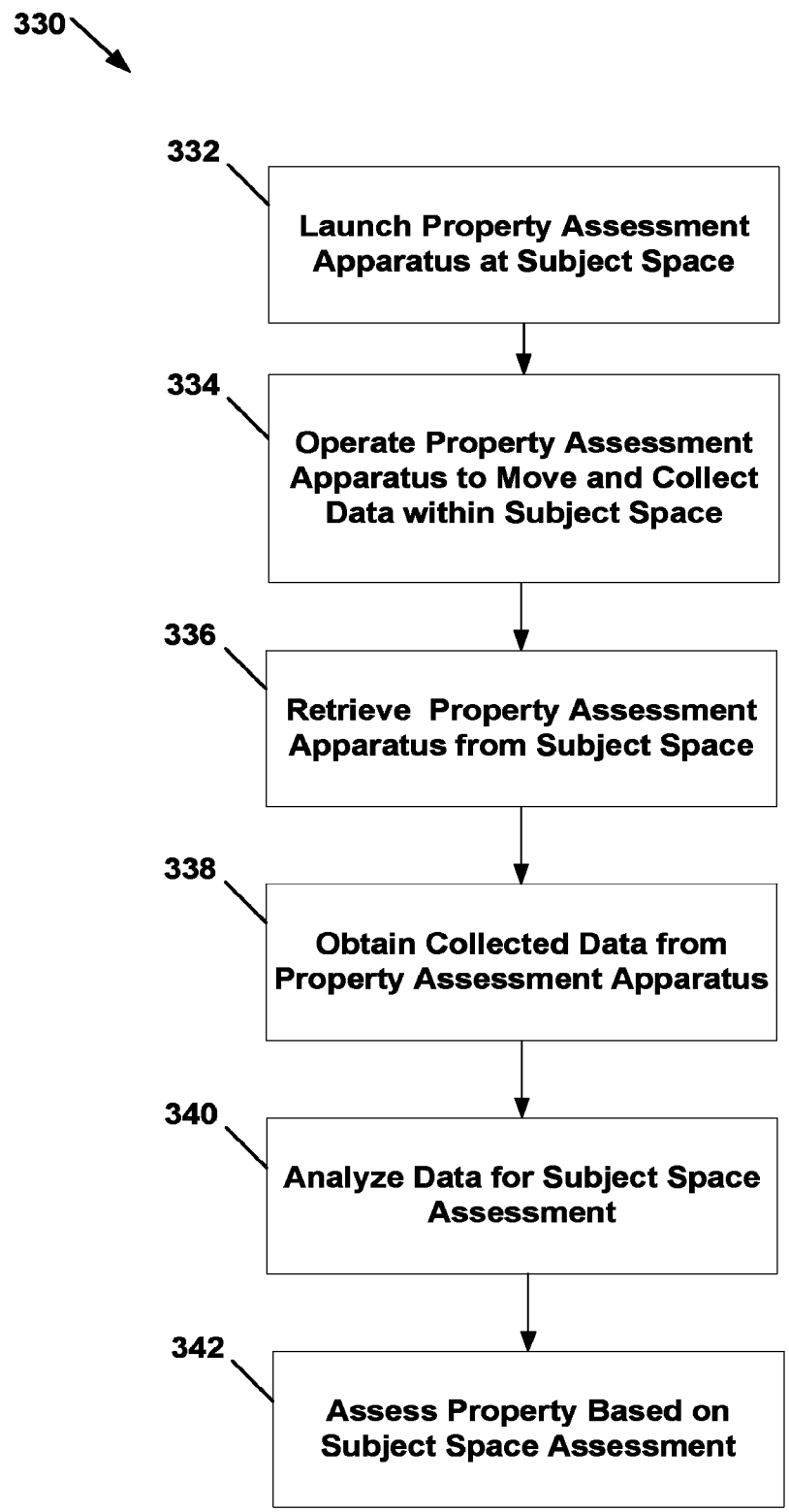
FIG. 9 is a flowchart of an example method for assessing a property.

FIG. 9 is a flowchart of an example method 330 for assessing a property using the property assessment system 100. In this example, the method 330 includes operations 332, 334, 336, 338, 340, and 342. In other examples, the method 330 includes one or more other operations in addition to all or some of the operations in this example. The method 330 is described with reference also to FIG. 10, which illustrates that the property assessment apparatus 102 moves through an example subject space 104.

The method 330 can begin at operation 332 in which the property assessment apparatus 102 is introduced into a subject space 104 in a property 106 to be inspected. As described herein, the subject space 104 can be of various types, some examples of which include a conduit, such as a water pipe, sewer pipe, gas pipe, other fluid pipe, and duct. Such a conduit can be either fully enclosed or partially open such as a culvert (e.g., open at inlet(s) and outlet(s)). The subject space 104 can further include any space that is not conveniently accessible by a person, such as a gap between structures, an attic, a ceiling, a space behind a wall (e.g., drywall), and a space under flooring. The property 106 can be of various types, such as residential properties or commercial properties.

In some embodiments, the property assessment apparatus 102 is launched at an existing opening or hole of the subject space 104, such as a vent or other opening of a conduit. In other embodiments, a small hole can be made to the subject space 104, which is sized enough to receive the property assessment apparatus 102 but not destructive to the property 106 (or minimum destruction). In some embodiments, there is no need of turning off fluid through the subject space.

At operation 334, the property assessment apparatus 102 operates to move within the subject space 104 and collect data from the subject space 104. As described above, some embodiments of the apparatus 102 are configured to be neutrally buoyant in the subject space 104 and move with flow inside the subject space. Other embodiments of the apparatus 102 are configured to float and move along flow inside the subject space. Yet other embodiments of the apparatus 102 are powered by a small actuator, such as by operating one or more propellers, by releasing propellant, by a small turbine, or by any battery-powered means.

As described herein, the apparatus 102 can be introduced into fluid flow (e.g., liquids or gases) in the subject space 104 regardless of whether the subject space 104 is configured as a conduit. Further, when the apparatus 102 is self-propelled, the apparatus 102 does not require fluid flow for placement or retrieval. For example, the apparatus 102, if configured to be neutrally buoyant slow-moving, neither gets stuck within the subject space 104 nor have parts (e.g., propeller blades) damaged in operation within the subject space 104.

In some embodiments, as described herein, the apparatus 102 are configured to travel to a predetermined location within the subject space 104. For example, the apparatus 102 includes a magnetic element, which is attracted to a corresponding magnetic element of a device external to the subject space 104. Such a magnetic attraction can enable the apparatus 102 to a particular location within the subject space where the external device is arranged outside the subject space. Alternatively, as described herein, inductive power can be used to attract the apparatus 102 to a location near the external device. For example, the apparatus 102 includes an antenna so that the apparatus 102 is powered by the external device through induction.

At operation 336, the property assessment apparatus 102 can be retrieved from the subject space 104. In some embodiments, the apparatus 102 is taken out from a different location than the location where the apparatus 102 is inserted into the subject space 104. In other embodiments, the apparatus 102 is retrieved from the same location where the apparatus 102 is inserted.

Alternatively, the apparatus 102 can remain with the subject space 104 once it finishes collecting data as programmed. The remaining apparatus can be retrieved later, reused for other inspections, or at least partially deflated (or dissolved) within the subject space 104.

At operation 338, the data collected by the property assessment apparatus 102 are obtained from the apparatus 102. Depending on the type of collected data, the method for obtaining the data may vary. For example, measurements, signals, images, or videos can be transmitted to a computing device, such as the interrogation device 300 and the property data management system 108, and saved therein in digital formats. Samples or particles can be physically gathered and delivered to a laboratory (such as a lab operating the property data management system 108) for further analysis.

In other embodiments, the data can be obtained before the apparatus 102 is retrieved from the subject space 104 (operation 336) or while the apparatus 102 remains within the subject space 104. For example, while the apparatus 102 is in the middle of a conduit, the data can be transmitted to an external computing device via a short-range wireless communications or to a remote computing device (e.g., the property data management system 108) via a long-range wireless communications.

At operation 340, the obtained data is analyzed for assessing the subject space 104. In some embodiments, the obtained data is used to evaluate the structure of the subject space 104 and the contents contained therein. For example, the data can be used to determine chemical composition of the structure of the subject space 104 (e.g., conduit lining chemical composition). Further, the data is used to identify a fluid contained in the subject space 104, such as quality and composition of expected fluid ingredients and/or contaminants (e.g., heavy metals, excessive volatile components, undesirable water or moisture, ice, mineral build-up, etc.). In addition, the data can be used to examine structural integrity of the subject space, such as by visual or sonic interrogation of the subject space. The data can further be used to locate any other devices or structures that are present within the subject space 104. Such other devices or structures may be undesirable within the subject space 104, which may have been left behind or planted maliciously.

At operation 342, the assessment of the subject space 104 is used to assess the property 106 including the subject space 104 for various purposes, such as appraisal, insurance, and maintenance, of the property. The followings are some example applications of the data assessment.

In some examples, the data obtained and assessed from the subject space 104 using the property assessment apparatus 102 can be used to evaluate the property 106 for appraisal or maintenance. For example, the intake and outflow of fluids (e.g., water or gas) through the subject space 104 can be assessed based on the data obtained at the operation 340 and used to evaluate the integrity of property structure for appraisal or maintenance. The obtained data also can be used to assess the intake and outflow of fluids through the subject space 104 and then identify potential features or hazards in the property for appraisal or maintenance.

In some examples, the data obtained and assessed from the subject space 104 using the property assessment apparatus 102 can be used to assess personal or commercial properties, such as industrial sites and public works (e.g., water pipes, conduits, sewer lines, natural gas lines, refinery conduits, pipes on ships, intake and outflow piping on aircraft).

In some examples, the data obtained and assessed from the subject space 104 using the property assessment apparatus 102 can be used for targeted remediation. Examples of targeted remediation include chemically neutralizing an issue, plugging leakage, deactivating intruder devices (e.g., cutting through an intruder circuit, applying shock to an intruder device, and collecting an intruder device), warming up icy area, boring through a blockage, performing a small explosion near a blockage, dropping insect or rodent repellent, etc.).

In some examples, the data obtained and assessed from the subject space 104 using the property assessment apparatus 102 can be used for various insurance applications.

The property assessment apparatus 102 and the method of operating the same enable more detailed assessment than typical property assessment practices, due to relative low cost and low invasiveness of the apparatus 102 and the method of operating the same. Typical property assessment practices involve creating large holes or removal of facades. In contrast, the method of operating the apparatus 102 according to the present disclosure does not require creating new holes or only requires small holes for introducing the apparatus 102. The more detailed assessment by using the apparatus 102 and the method of the present disclosure allows more favorable pricing of insurance for customers due to the risk mitigation allowed by detailed inspection. Further, the more detailed assessment of the present disclosure can identify properties that would be unfavorable to insure, such as hazards which are not obvious without the detailed inspection.

The property assessment apparatus 102 and the method of operating the same can be used to identify code violations associated with the property 106 inspected. With such identification, insurance can be predicated on fixing the violations, or the premium can increase when the violations are not fixed.

The property assessment apparatus 102 and the method of operating the same can turn risky properties to be insurable. For example, properties in a flood prone area can be insurable if tenants or homeowners agree to specific periodic inspections using the apparatus 102. The pricing can be determined according to findings of initial inspection and predicated on continued periodic inspections coming back clean. For example, flooding can be expected up to certain point in a property. If flooding exceeds the point, the property can henceforth be uninsurable or get different pricing.

Information from detailed assessments of a number of properties using the method of the present disclosure can be pooled to calculate risk on another property. For example, the risk on properties at an elevation may be similar to nearby properties at a similar elevation which have experienced flooding. The risk can increase on a property sharing a wooden wall with another uninsurable property due to fire hazards. Properties having certain level of mildew or wood rot, in combination with certain level of external flood hazard, are suggestive of future hazards to properties with similar conditions. These situations can be suggestive of untestable factors such as the tenants or homeowners' willingness to protect properties.

The property assessment system of the present disclosure enables collecting standardized data elements which can be meaningfully pooled and analyzed. Images captured during data collection by the apparatus 102 can be tagged with appropriate names and other information to this end. Collected data can be maintained about suspected hazards and confirmed hazards so that modeling and analyzing (e.g., using machine learning technology) can be performed.

In some embodiments, a risk score can be created as a product, which quantifies various undesirable conditions (e.g., hazards) as collected by the property assessment apparatus 102. For example, the risk of negative outcome can be calculated as a score based on presence of known hazards. By way of example, a risk score increases if there are beams installed incorrectly, because such incorrectly installed beams may cause building collapse if there is ground movement.

In some embodiments, the risk scores that are calculated based on the data collected and analyzed using the property assessment system of the present disclosure can be combined with traditionally collected data elements.

In some embodiments, a risk score can be created as a product, which quantifies presence of undesirable conditions (e.g., hazards) based on inconclusive data collected by the property assessment apparatus 102. Such a risk score can represent a risk of true presence of undesirable conditions, such as a risk of previous severe flood based on presence of various conditions (e.g., mildew type and prevalence, mold type and prevalence, wood rot type and prevalence, photographs of blotchy area, etc.).

The property assessment system of the present disclosure can be used for insurance of industrial properties. The pricing can be predicated on periodic inspection of infrastructure by the property assessment apparatus 102, which provides a low cost, efficient, and more detailed alternative to or supplement of on-site inspections by humans.

The property assessment system of the present disclosure can be used to evaluate various risks for insurance purposes. In an example of flood risk, the insurer the provides insurance for flood risk areas can specify that the property assessment apparatus 102 be introduced to certain areas on a regular basis and sent back to a lab for analysis. The lab can examine the collected data (e.g., measurements and samples) and generate a report. The report can include various information, such as current conditions (e.g., mold, mildew, wood rot, and moisture) in the inspected property, and a past property damage history (e.g., flooding) assessed based on the current conditions. The lab can further inspect the apparatus to ensure that the apparatus has not been tampered by the user.

Similarly to the example of flood risk above, in an example of fire hazards, the property assessment apparatus 102 can be used to identify wiring problems, such as outdated wiring, uninsulated wiring, inadequate gauge, overloaded wiring, and any other incorrect wiring.

Similarly to the example of flood risk above, in an example of hazardous materials, the property assessment apparatus 102 can be used to identify, for example, chemicals, spills, asbestos, and lead (e.g., solder in pipes). As described herein, these materials can be obtained by capturing images and/or collecting samples. In some example, the samples can be collected only after materials are allegedly identified by the images.

Similarly to the example of flood risk above, in an example of earthquake safety, the property assessment apparatus 102 can be used to identify or confirm structural soundness of architectural elements that are not easily accessible.

In some examples, the data obtained and assessed from the subject space 104 using the property assessment apparatus 102 can be used for appraisal purposes.

The property assessment apparatus 102 and the method of operating the same enable more detailed assessment than typical property assessment practices, due to relative low cost and low invasiveness of the apparatus 102 and the method of operating the same. Typical property assessment practices involve creating large holes or removal of facades.

In contrast, the method of operating the apparatus 102 according to the present disclosure does not require creating new holes or only requires small holes for introducing the apparatus 102. The more detailed assessment by using the apparatus 102 and the method of the present disclosure allows more accurate estimates of property value. Some undiagnosed issues can include past flooding, fire hazards, and structural issues (e.g., beams incorrectly placed behind walls, inexpert renovations, small fires that damaged unit elements, animal damages, etc.). Some finds from the apparatus 102 may lead to lower appraised value, or requirement of remediation of issues prior to issuing a mortgage.

The property assessment system of the present disclosure may provide a lower cost alternative to onsite visits by humans. For example, in the case of high values properties, the property assessment system of the present disclosure can provide supplementary information not generally available to onsite human inspectors.

Some appraisals can include inspection of properties to find mold, mildew, wood rot, and moisture using the apparatus 102 and evaluate them to look for past flooding of the properties, either flooding from the exterior or interior leaks (e.g., pipe problems, roof leaks, etc.).

The property assessment system of the present disclosure can be used to identify code violations associated with the property 106 inspected. Such identification of code violations can affect appraised value if they need to be fixed or pose risks.

The property assessment system of the present disclosure can be used to evaluate various risks for appraisal purposes. In an example of fire hazards, the property assessment apparatus 102 can be used to identify wiring problems, such as outdated wiring, uninsulated wiring, inadequate gauge, overloaded wiring, and any other incorrect wiring. The apparatus 102 can further be used to detect evidence of past fires. In an example of hazardous materials, the property assessment apparatus 102 can be used to identify, for example, chemicals, spills, asbestos, and lead (e.g., solder in pipes). As described herein, these materials can be obtained by capturing images and/or collecting samples. In some example, the samples can be collected only after materials are allegedly identified by the images. In an example of earthquake safety, the property assessment apparatus 102 can be used to identify or confirm structural soundness of architectural elements that are not easily accessible.

According to the present disclosure, in some embodiments, the property assessment apparatus 102 can be configured to be used to temporarily block or plug a hole in the subject space (e.g., a conduit). This can help stopping flow downstream in the conduit so that the downstream of the conduit can be inspected. Further, the apparatus 102 can function as an emergency water stopper or stoppage buster. The apparatus 102 can be retrieved after use.

In some embodiments, the apparatus can carry a clog-busting product or clog remover and release it when the apparatus reaches a clogged location in the conduit.

In some embodiments, the property assessment apparatus 102 can be left in the subject space after use. The apparatus 102 can be configured to automatically deflate (self-deflated) within the subject space. By way of example, where the housing 142 of the apparatus 102 is configured as, or includes, an inflatable balloon, the balloon can be exploded (e.g., with a needle contained in the apparatus 102) or deflated itself as programmed. An alternative method for deflating the apparatus 102 is making the housing of the apparatus (or the inflatable part of the housing) with a slowly dissolving material. Such explosion or deflation can avoid the apparatus causing clogs or obstruction within the subject space.

The apparatus 102 being used to create an intentional blockage which is removed later can automatically unblock eventually if a normal use of the apparatus does not work.

The apparatus 102 that is used in an aqueous environment can be made at least partially of materials that slowly dissolve in water. Similarly, the apparatus 102 that is used in an oil based environment can be made at least partially of materials that slowly dissolve in oil. Similarly, the apparatus 102 that is used in air can be made at least partially of materials that slowly disintegrate when exposed to oxygen or other gases in air.

The thickness of materials used to make the apparatus can be used to control how long the apparatus works. For example, the thickness of the inflatable portion of the apparatus can be used to control how long that part is inflated in the subject space. In some examples, there can be a small portion of the inflatable part that changes thickness while the rest is a standard thickness greater than the part used to control the inflation.

Figure 10:
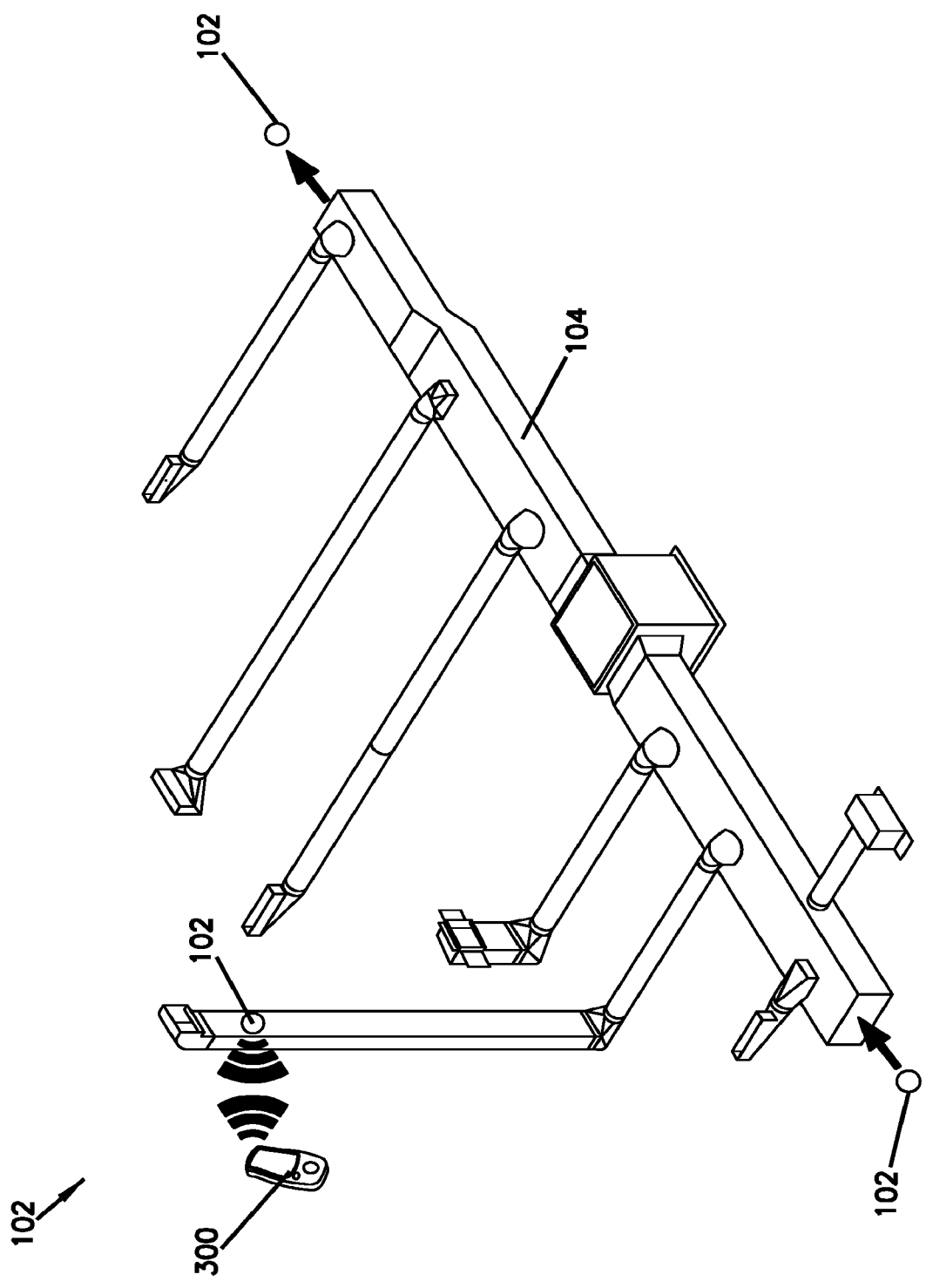
FIG. 10 illustrates an example method for operating a property assessment apparatus with respect to a conduit system.

Although the operation of the property assessment apparatus 102 is primarily described where the apparatus 102 is used with the conduit system as illustrated in FIG. 10, it is understood that the apparatus 102 can be used with any other spaces, one example of which is an attic. By way of example, the property assessment apparatus 102 is launched into an attic to take pictures, measure the internal temperature, and perform other data collections inside the attic. Such collected data can be used to determine the condition within the attic, determine whether a fan needs to be installed in the attic, determine what kind of temperature remediation is needed in the attic, assess insulation or lack thereof, and/or determine where ducts or pipelines need to be placed in the attic.

In some embodiments, the subject space 104 is constructed to incorporate a track for the property assessment apparatus 102. In an example of a conduit as the subject space, the conduit can be configured and installed to have a track incorporated, and the apparatus moves on the track along the conduit.

Figure 11:
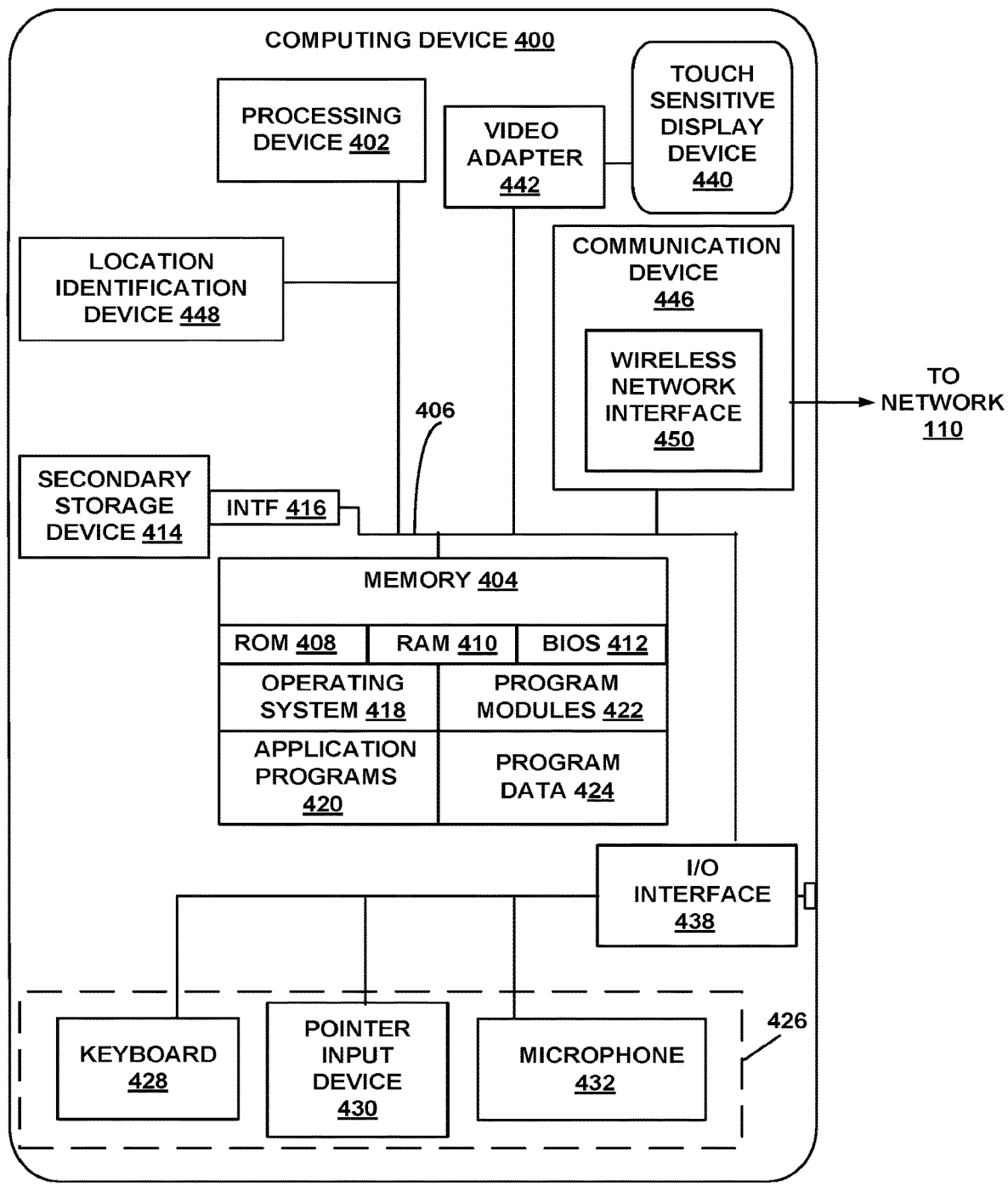
FIG. 11 illustrates an exemplary architecture of a computing device which can be used to implement aspects of the present disclosure.

FIG. 11 illustrates an exemplary architecture of a computing device 400 which can be used to implement aspects of the present disclosure, including the property assessment apparatus 102, the property data management system 108, and the interrogation device 300, and will be referred to herein as the computing device 400. The computing device 400 is used to execute the operating system, application programs, and software modules (including the software engines) described herein. The property assessment apparatus 102, the property data management system 108, and the interrogation device 300 can include all or some of the elements described with reference to FIG. 11, with or without additional elements.

The computing device 400 can be of various types. In some embodiments, the computing device 400 is one or more desktop computers, one or more laptop computers, other devices configured to process digital instructions, or any combination thereof. In other embodiments, the computing device 400 is one or more mobile computing devices. Examples of the computing device 400 as a mobile computing device include a mobile device (e.g., a smart phone and a tablet computer), a wearable computer (e.g., a smartwatch and a head-mounted display), a personal digital assistant (PDA), a handheld game console, a portable media player, a ultra-mobile PC, a digital still camera, a digital video camera, and other mobile devices.

The computing device 400 includes, in some embodiments, at least one processing device 402, such as a central processing unit (CPU). A variety of processing devices are available from a variety of manufacturers, for example, Intel or Advanced Micro Devices. In this example, the computing device 400 also includes a system memory 404, and a system bus 406 that couples various system components including the system memory 404 to the processing device 402. The system bus 406 is one of any number of types of bus structures including a memory bus, or memory controller; a peripheral bus; and a local bus using any of a variety of bus architectures.

The system memory 404 includes read only memory 408 and random access memory 410. A basic input/output system 412 containing the basic routines that act to transfer information within the computing device 400, such as during start up, is typically stored in the read only memory 408.

The computing device 400 also includes a secondary storage device 414 in some embodiments, such as a hard disk drive, for storing digital data. The secondary storage device 414 is connected to the system bus 406 by a secondary storage interface 416. The secondary storage devices and their associated computer readable media provide nonvolatile storage of computer readable instructions (including application programs and program modules), data structures, and other data for the computing device 400.

Although the exemplary environment described herein employs a hard disk drive as a secondary storage device, other types of computer readable storage media are used in other embodiments. Examples of these other types of computer readable storage media include flash memory cards, digital video disks, compact disc read only memories, digital versatile disk read only memories, random access memories, or read only memories. Some embodiments include non-transitory media.

A number of program modules can be stored in secondary storage device 414 or memory 404, including an operating system 418, one or more application programs 420, other program modules 422, and program data 424.

In some embodiments, the computing device 400 includes input devices to enable a user to provide inputs to the computing device 400. Examples of input devices 426 include a keyboard 428, a pointer input device 430, a microphone 432, and a touch sensitive display 440. Other embodiments include other input devices. The input devices are often connected to the processing device 402 through an input/output interface 438 that is coupled to the system bus 406. These input devices 426 can be connected by any number of input/output interfaces, such as a parallel port, serial port, game port, or a universal serial bus. Wireless communication between input devices and interface 438 is possible as well, and includes infrared, BLUETOOTH® wireless technology, 802.11a/b/g/n, cellular, or other radio frequency communication systems in some possible embodiments.

In this example embodiment, a touch sensitive display device 440 is also connected to the system bus 406 via an interface, such as a video adapter 442. The touch sensitive display device 440 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 440, the computing device 400 can include various other peripheral devices (not shown), such as speakers or a printer.

The computing device 400 further includes a communication device 446 configured to establish communication across the network. In some embodiments, when used in a local area networking environment or a wide area networking environment (such as the Internet), the computing device 400 is typically connected to the network through a network interface, such as a wireless network interface 450. Other possible embodiments use other wired and/or wireless communication devices. For example, some embodiments of the computing device 400 include an Ethernet network interface, or a modem for communicating across the network. In yet other embodiments, the communication device 446 is capable of short-range wireless communication. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, and a Wi-Fi technology.

The computing device 400 typically includes at least some form of computer-readable media. Computer readable media includes any available media that can be accessed by the computing device 400. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 400. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 11 is also an example of programmable electronics, which may include one or more such computing devices, and when multiple computing devices are included, such computing devices can be coupled together with a suitable data communication network so as to collectively perform the various functions, methods, or operations disclosed herein.

Referring again to FIG. 11, the computing device 400 can include a location identification device 448. The location identification device 448 is configured to identify the location or geolocation of the computing device 400. The location identification device 448 can use various types of geolocating or positioning systems, such as network-based systems, handset-based systems, SIM-based systems, Wi-Fi positioning systems, and hybrid positioning systems. Network-based systems utilize service provider's network infrastructure, such as cell tower triangulation. Handset-based systems typically use the Global Positioning System (GPS). Wi-Fi positioning systems can be used when GPS is inadequate due to various causes including multipath and signal blockage indoors. Hybrid positioning systems use a combination of network-based and handset-based technologies for location determination, such as Assisted GPS.

In some examples, the computing device 400 is configured to operate as, or work with, a transaction instrument, in which payment information is transmitted via the communication device. As described herein, the computing device 400 as such a transaction instrument can be implemented in the property assessment apparatus 102, the property data management system 108, and other computing devices associated with the apparatus 102 and/or the system 108.

In the present disclosure, such payment can include payment for inspection, remediation, or assessment of the space or the property. The payments can be micropayments. The payments can be assessed by the computing device 400 per service performed (e.g., each time a clog is remediated, or an image captured, or a sample collected), or may be batched per a series of services. The transaction instrument can be configured to work with various types of payment instruments, such as credit cards, debit cards, digital currency, or other suitable payment instruments. The computing device 400 can allow for different types of services to be paid for different transaction instruments or payment types, such as Automated Clearing House (ACH), wires, etc. In some examples, the computing device 400 is configured as a digital wallet that contains transaction instruments.

As such, a property assessment device of the present disclosure is used to better understand what is happening in a space that is not easily accessible, such as conduits for fluids (e.g., air ducts and pipes for liquids). The property assessment device is configured and used to assess such a space and the contents therein, which may reveal information that affects the value of a property that contains the space. The assessment by the property assessment device can also be used to provide information that reveals the maintenance requirements of the space and its contents, and remediation needs upstream.

As described herein, the space can be assessed by the property assessment device that is introduced at a first location (e.g., upstream) of the space and extracted at a second location (e.g., downstream) of the space. The property assessment device is "ingestible" by the property and moves in the space for assessment. The property assessment device can move in the space in various manners. In some embodiments, the property assessment device is configured to include an air balloon that enables the property assessment device to float or drift through the space. In other embodiments, the property assessment device is configured to be self-propelled.

In some embodiments, the information collected by the property assessment device is transferred to an external computing device, either wirelessly or in a wired connection, once the property assessment device is collected at the second location of the space. In other embodiments, the property assessment device can operate transmit information in real time as it traverses the space. In yet other embodiments, an external device can be used to collect information from the property assessment device at a predetermined or random location where the property assessment device is positioned in the course of movement.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A property assessment apparatus for assessing a space in a property, the apparatus comprising:
    a housing;
    a processor mounted to the housing;
    a data collector mounted to the housing and controlled by the processor, the data collector configured to collect data related to one or more conditions of the property;
    an actuator mounted to the housing and controlled by the processor, the actuator configured to actuate the apparatus to move within the space in the property;
    a first magnetic element that enables the property assessment apparatus to adhere to an inside surface of a wall of the space when an interrogation device located on an outside surface of the wall of the space attracts the property assessment apparatus using a corresponding second magnetic element; and
    a communication device configured to wirelessly transmit the collected data from the property assessment apparatus to the interrogation device.

2. The apparatus of claim 1, wherein the communication device includes an antenna configured to transmit at a predetermined frequency.

3. The apparatus of claim 1, wherein the interrogation device sends a homing signal to the property assessment apparatus to attract the property assessment apparatus to a location proximate to the interrogation device.

4. The apparatus of claim 1, wherein the actuator further includes a self-propelling device, the self-propelling device including one or more propellers mounted to the housing to maneuver the property assessment apparatus through a fluid in the space.

5. The apparatus of claim 1, wherein the actuator further includes a self-propelling device, the self-propelling device including a container of propellant.

6. The apparatus of claim 1, wherein the actuator further includes a self-propelling device, the self-propelling device including a turbine.

7. The apparatus of claim 1, further comprising a protective cage at least partially surrounding the housing and configured to protect the housing from damage.

8. The apparatus of claim 1, wherein the housing includes a plurality of mounting devices configured to mount the data collector.

9. The apparatus of claim 1, wherein the data collector includes at least one of a subject space content detector, a temperature sensor, a sound detector, an image capture device, a lighting device, a particle collector, a density sensor, a reflectivity sensor, a gyroscope sensor, and a shock detector.

10. The apparatus of claim 1, wherein the housing is configured to be spherical.

11. The apparatus of claim 1, wherein the apparatus is configured as a transaction instrument.

12. A method of assessing a space in a property, the method comprising:
- inserting the property assessment apparatus into the space;
- actuating the property assessment apparatus within the space using an actuator mounted to a housing of the property assessment apparatus;
- collecting data related to one or more conditions of the space using a data collector mounted to the housing of the property assessment apparatus;
- enabling the property assessment apparatus to adhere to an inside surface of a wall of the space using a first magnetic element associated with the property assessment apparatus when an interrogation device located on an outside surface of the wall of the space attracts the property assessment apparatus using a corresponding second magnetic element; and
- transmitting the collected data from the property assessment apparatus to the interrogation device using a communication device, wherein the transmitted data is evaluated to assess the space in the property.

13. The method of claim 12, further comprising:
retrieving the apparatus from the space.

14. The method of claim 12, wherein the communication device includes an antenna configured to transmit at a predetermined frequency.

15. The method of claim 12, wherein the interrogation device sends a homing signal to the property assessment apparatus to attract the property assessment apparatus to a location proximate to the interrogation device.

16. The method of claim 12, wherein the actuator further includes a self-propelling device, the self-propelling device including one or more propellers mounted to the housing to maneuver the property assessment apparatus through a fluid in the space.

17. The method of claim 12, wherein the data collector includes at least one of a subject space content detector, a temperature sensor, a sound detector, an image capture device, a lighting device, a particle collector, a density sensor, a reflectivity sensor, a gyroscope sensor, and a shock detector.

18. The method of claim 12, wherein the data include measurements, signals, digital images, and samples.

19. The method of claim 12, wherein the property assessment apparatus is configured as a transaction instrument.

20. A system for assessing a conduit in a property, the system comprising:
- a property assessment apparatus comprising:
  - a housing;
  - a processing unit mounted to the housing;
  - a data collector mounted to the housing and controlled by the processing unit, the data collector configured to collect data within the conduit in the property, the data being related to one or more conditions of the property;
  - an actuator mounted to the housing and controlled by the processing unit, the actuator configured to actuate the apparatus to move within the conduit in the property;
  - a first magnetic element that enables the property assessment apparatus to adhere to an inside surface of a wall of the conduit; and
  - a communication device configured to wirelessly transmit the collected data;
- an interrogation device comprising:
  - a second magnetic element,
  - wherein the interrogation device is located on an outside surface of the wall of the conduit and causes the property assessment apparatus to adhere to the inside surface of the wall of the conduit using the second magnetic element; and
  - wherein the interrogation device is configured to communicate with the property assessment apparatus to receive the collected data from the property assessment apparatus.

* * * * *